(12) United States Patent
Barlow

(10) Patent No.: US 9,809,992 B1
(45) Date of Patent: Nov. 7, 2017

(54) UTILITY MARKER WITH INTEGRATED NEST BOX

(71) Applicant: Stephen E Barlow, Edgefield, SC (US)

(72) Inventor: Stephen E Barlow, Edgefield, SC (US)

( * ) Notice: Subject to any disclaimer, the term of this patent is extended or adjusted under 35 U.S.C. 154(b) by 134 days.

(21) Appl. No.: 14/732,877

(22) Filed: Jun. 8, 2015

Related U.S. Application Data

(60) Provisional application No. 62/008,843, filed on Jun. 6, 2014.

(51) Int. Cl.
*E04H 12/00* (2006.01)
*E01F 9/00* (2016.01)

(52) U.S. Cl.
CPC .......... *E04H 12/00* (2013.01); *E01F 9/00* (2013.01)

(58) Field of Classification Search
CPC .......... E04H 12/00; E01F 9/00; E01F 9/012
USPC ...... 116/200, 209, 63 P, 63 R; 119/432, 435; 256/32; 404/6
See application file for complete search history.

(56) References Cited

U.S. PATENT DOCUMENTS

| | | | | |
|---|---|---|---|---|
| 427,394 A | * | 5/1890 | Brown ................. | E04H 13/003 40/607.01 |
| 482,062 A | * | 9/1892 | McBroom ............. | E04H 13/003 52/103 |
| 1,219,454 A | * | 3/1917 | Hanson ................. | E04H 13/003 52/103 |
| 2,181,977 A | * | 12/1939 | Magovern ............. | G09F 3/206 40/645 |
| 3,173,662 A | * | 3/1965 | Millerbernd .......... | E04H 17/10 256/52 |
| 3,318,560 A | * | 5/1967 | Garrette, Jr. ......... | E04H 12/182 248/156 |
| 3,503,163 A | * | 3/1970 | Lutz .................... | G01C 15/04 33/296 |
| 3,696,792 A | * | 10/1972 | Bruhns ................. | A01K 31/14 119/428 |
| 3,720,401 A | * | 3/1973 | Loch .................... | E04H 17/06 256/19 |
| 3,792,685 A | * | 2/1974 | Wiener ................. | A01K 31/14 119/428 |
| 4,124,198 A | * | 11/1978 | Wong .................. | E04H 17/16 256/19 |
| 4,441,288 A | * | 4/1984 | Feldman ............... | E01F 9/685 52/103 |
| 4,540,160 A | * | 9/1985 | Zanavich ............. | E04H 17/1413 256/13.1 |
| 4,803,812 A | * | 2/1989 | Alexander, Sr. ...... | E02D 5/801 52/157 |
| 5,056,454 A | * | 10/1991 | Turner ................. | G09F 11/04 116/209 |

(Continued)

*Primary Examiner* — R. A. Smith
*Assistant Examiner* — Tania Courson
(74) *Attorney, Agent, or Firm* — Nelson Mullins Riley & Scarborough, LLP

(57) ABSTRACT

A utility marker comprises a support pole for placement in the ground at a desired location to be marked. An enhancer, located at the upper end of the support pole, is adapted to designate a particular type of utility line under the ground. The enhancer defines an internal cavity in which a nesting animal may nest. An opening is provided in the enhancer to allow ingress and egress of the nesting animal. Preferably, the enhancer is colored according to a predetermined color scheme to designate the particular type of utility line and may have utility marker indicia located thereon.

14 Claims, 3 Drawing Sheets

(56) References Cited

U.S. PATENT DOCUMENTS

| | | | | |
|---|---|---|---|---|
| D359,437 S | * | 6/1995 | Bilotti | D8/349 |
| 5,722,788 A | * | 3/1998 | Bent | E01F 9/70 |
| | | | | 116/173 |
| 6,220,200 B1 | * | 4/2001 | Howard | G09F 3/00 |
| | | | | 116/209 |
| 6,286,450 B1 | * | 9/2001 | Murrin | G09F 15/00 |
| | | | | 116/201 |
| 6,405,679 B1 | * | 6/2002 | Sonnek | A01K 31/14 |
| | | | | 119/432 |
| 6,536,369 B1 | * | 3/2003 | Bent | E01F 9/688 |
| | | | | 116/173 |
| 6,578,512 B2 | * | 6/2003 | Truax | G01C 15/04 |
| | | | | 116/209 |
| 6,832,575 B2 | * | 12/2004 | Carroll, Jr. | G01C 15/02 |
| | | | | 116/209 |
| 6,880,486 B2 | * | 4/2005 | Sonnek | A01K 31/14 |
| | | | | 119/428 |
| 7,191,573 B1 | * | 3/2007 | Newton, II | E04H 12/2253 |
| | | | | 52/170 |
| 2004/0031214 A1 | * | 2/2004 | Fong | G01C 15/04 |
| | | | | 52/103 |
| 2009/0139460 A1 | * | 6/2009 | Sonnek | A01K 31/14 |
| | | | | 119/435 |

\* cited by examiner

UTILITY MARKER WITH INTEGRATED NEST BOX

PRIORITY CLAIM

This application is based upon and claims the benefit of U.S. provisional application Ser. No. 62/008,843, filed Jun. 6, 2014, the entire disclosure of which is incorporated herein by reference for all purposes.

BACKGROUND OF THE INVENTION

The present invention relates to utility markers that are used to indicate the right of way of an underground utility line. More particularly, the present invention relates to such a utility marker adapted to include a nest "box," as well a nest box for use with such a utility marker.

Across the United States, millions of utility markers denote the presence of underground utilities, such as water lines, petroleum pipelines, electrical lines, fiber optic cables, and other utilities along rights of way. These markers are ubiquitous in the landscape and are typically placed along cleared right of way corridors. Markers often occur in a forest "edge" type habitat, the ideal habitat for a variety of secondary cavity nesting bird species.

Secondary cavity nesting bird species, such as the eastern blue bird, require a nest cavity, such as a hollow tree, in which to nest and brood their young. Secondary cavity nesters are incapable of excavating a tree to create a cavity so must depend upon other species or natural weathering to create suitable cavities for nesting. The availability of suitable nesting cavities is a limiting factor for these bird populations. It has been demonstrated that populations of secondary cavity nesters can be increased by providing nest boxes.

Natural cavity availability for native nesting birds has declined over the past 100 years for a variety of reasons, including logging, use of steel fence posts, fire exclusion, and competition from exotic cavity nesting birds such as European starlings and house sparrows. This has most probably contributed to a concomitant decline in many native cavity nesting bird species. Over the past 30 years many of these species have begun a comeback as people have put up dedicated nest boxes.

The present invention recognizes the foregoing considerations, and others, of the prior art.

SUMMARY OF THE INVENTION

In accordance with one aspect, the present invention provides a utility marker comprising a support pole for placement in the ground at a desired location to be marked. An enhancer, located at the upper end of the support pole, is adapted to designate a particular type of utility line under the ground. The enhancer defines an internal cavity in which a nesting animal may nest. An opening is provided in the enhancer to allow ingress and egress of the nesting animal. Preferably, the enhancer is colored according to a predetermined color scheme to designate the particular type of utility line and may have utility marker indicia located thereon.

In preferred embodiments, the internal cavity of the enhancer has a tubular shape that facilitates a circular nest pattern. In addition, the ingress/egress opening may be a circular opening (e.g., having a diameter of approximately 1.5 inches). Often, it will be desirable for the enhancer to comprise a main housing portion and a cap. In such embodiments, the cap may be configured to provide ventilation at an upper end of the main housing portion.

According to another aspect, the present invention provides a utility marker enhancer mountable to a support pole located in the ground. The enhancer comprises a generally tubular main housing portion colored according to a predetermined color scheme to designate a particular type of utility line. The main housing portion defines an internal cavity in which a nesting animal may nest. The enhancer further defines an opening to allow ingress and egress of the nesting animal.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
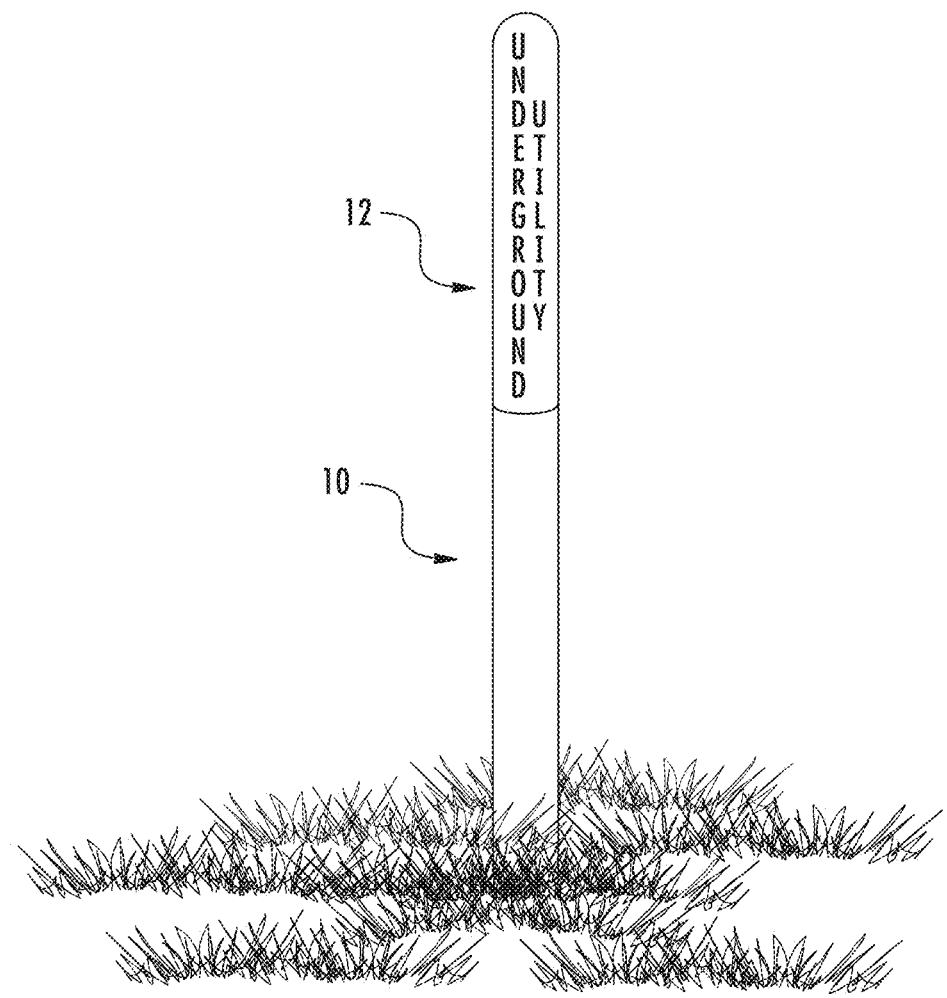
FIG. 1 is a perspective view of a typical utility marker of the prior art installed in the field having a brightly-colored enhancer mounted to the end of a support pole.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a common utility marker used to show the location of a utility line. As can be seen, the marker has a support pole 10 planted in the ground at the desired location. An enhancer 12 is located at the upper end of support pole 10. Enhancer 12 is typically brightly colored and marked with various indicia indicating the type of utility line under the ground and/or identifying the utility company. Often, the enhancer is secured in place using screws extending into holes located in the support pole.

Figure 2:
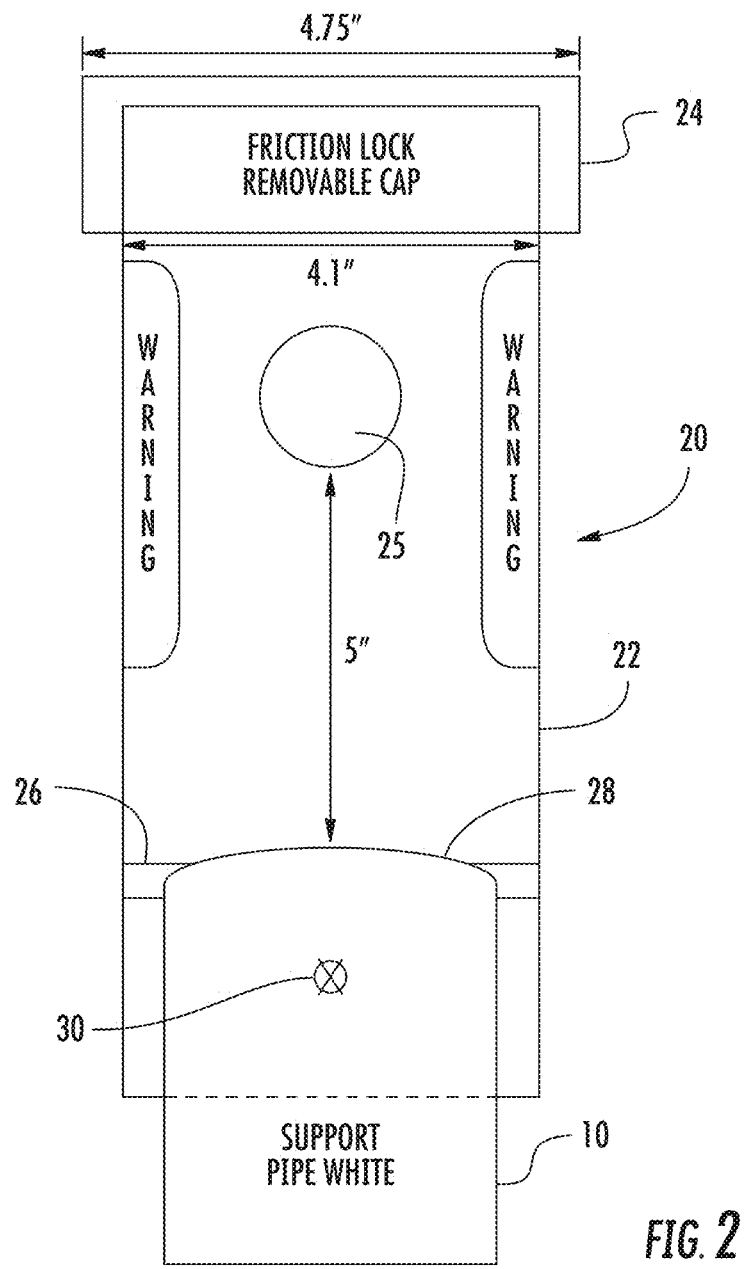
FIG. 2 is a diagrammatic representation of an exemplary nest box for use with a typical utility marker support pole in accordance with an embodiment of the present invention.

Embodiments of the present invention provide a wildlife nest box which may be used in lieu of prior art enhancer 12. The nest box performs the same function as the enhancer while also providing a nesting habitat for a desired nesting species. In this regard, FIG. 2 illustrates a nest box 20 in accordance with an embodiment of the present invention. It should be noted that the reference to "box" is not intended to connote shape, but instead indicates that the structure provides an interior suitable for the animal to establish a nest. In this regard, nest box 20 includes a main housing portion 22 which may preferably have a tubular (or pipe-like) shape. For reasons to be explained, both ends of main housing portion 20 are open in this embodiment.

The upper end of main housing portion 22 is covered with a cap 24, which may be attached using any suitable method such as a friction lock (or "press fit"). Preferably, cap 24 is configured to allow some ventilation into and from the interior cavity of main housing portion 22. (Alternatively, or in addition, ventilation holes may be provided in the upper area of main housing portion 22.) This permits heat from inside of the nesting cavity to more easily escape. Because cap 24 is removable, the interior of main housing portion 22 may be inspected or cleaned as necessary or desired.

Typical indicia (such as "Warning") may be provided on the outer surface of main housing portion 22. In addition, main housing portion 22 is typically colored consistent with the traditional coloring scheme for utility marker enhancers. Examples of this coloring scheme are: Orange—wire; Blue—water; White/gray—water; or Yellow—gas. The exterior dimensions of nest box 20 are suitable for the utility enhancer function while the interior dimensions provide appropriate space for nesting, roosting or cover habitat for wildlife. In this regard, a suitably-sized hole 25 (such as a 1.5 inch diameter hole) is defined in main housing portion 22 for ingress and egress of the nesting animal. (A 1.5" circular opening is a standard entry point for bird houses.)

In this embodiment, main housing portion 22 slides over the upper end of support pole 10 in a manner similar to typical utility marker enhancers. In particular, the inner diameter of main housing portion 22 is slightly larger than the outer diameter of support pole 10 so that main housing portion 22 may be snugly received on support pole 10. Preferably, nest box 20 will not lean or shift in the presence of strong wind or other external forces.

A suitable stop may be provided at a desired location inside of main housing portion 22 in order to limit the extent to which main housing portion 22 can be received over support pole 10. In this embodiment, for example, an annular flange (or "lip") 26 extends inwardly from the inner surface of main housing portion 22. Flange 26 thus engages the top 28 of support pole 10 as nest box 20 is installed. As a result, the combination of flange 26 and top 28 of support pole 10 function together to provide a floor for the internal nesting cavity. (Alternatively, the stop may be a full disc in which case it will entirely form the floor.) In a preferred embodiment, the floor may be located approximately five (5) inches from the bottom of hole 25, and the interior diameter of main housing portion 22 may be approximately 4.1 inches. Bluebirds and other cavity nesting birds will readily utilize the round pipe shaped nesting cavity because it closely replicates the natural hollow tree cavity shape the birds have evolved to use.

Preferably, the nest box 20 may be formed of a suitable plastic material such as polyvinyl chloride (PVC). Such a material has certain advantages over wooden nest boxes such as—extreme outdoor weathering capabilities, inability to be "blown out" by woodpeckers, it is less attractive to exotic house sparrows, and it is easily integrated onto a plastic, rot resistant support pole.

Nest box 20 is suitably configured for attachment to the particular support pole 10 with which it will be used. In this embodiment, for example, the existing enhancer being replaced by nest box 20 was mounted to support pole 10 using a pair of diametrically-opposed screws (or rivets). Accordingly, suitable holes are defined in the bottom area of main housing portion 22 for receipt of these same screws. (One such screw is indicated at 30.) Of course, one skilled in the art will appreciate that any suitable means of securing nest box 20 with respect to the support pole may be used.

Figure 3:
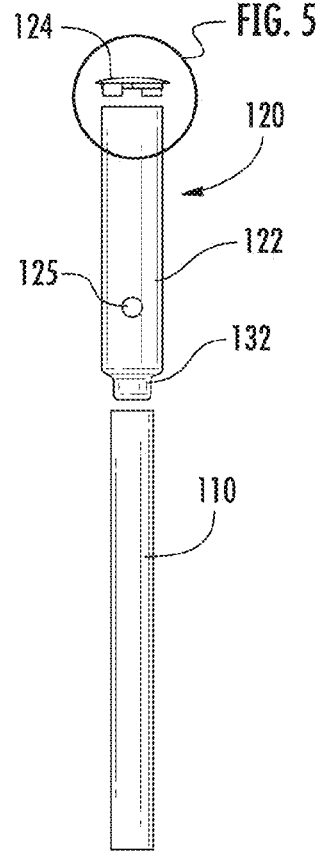
FIGS. 3 and 4 are perspective exploded views of a nest box enhancer and utility marker support pole in accordance with another embodiment of the present invention.
Figure 4:
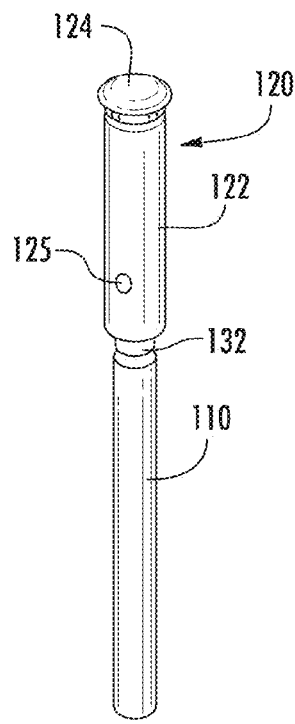

FIGS. 3 and 4 illustrate a nest box 120 in accordance with an alternative embodiment of the present invention mounted to a support pole 110. In many dimensional aspects, nest box 120 is similar to nest box 20 of the previous embodiment. For example, nest box 120 includes a generally tubular main housing portion 122 which defines an interior cavity suitable for an animal to nest. A suitably-sized hole 125 is defined on the side of main housing portion 122, as shown, to allow ingress of a desired species.

In this case, the upper end of support pole 110 is open rather than closed as was the upper end of support pole 10. As shown, main housing portion 122 includes an integral lower protrusion 132 which is snugly received in the open upper end of support pole 110. Nest box 120 may then be suitably secured, such as by screws or rivets (or other suitable fasteners) extending into protrusion 132 through support pole 110.

Figure 5:
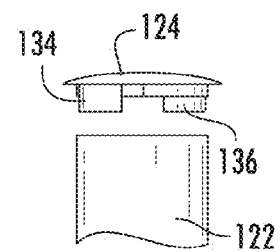
FIG. 5 is an enlarged fragmentary view of the area so indicated in FIG. 3.
Figure 6A:
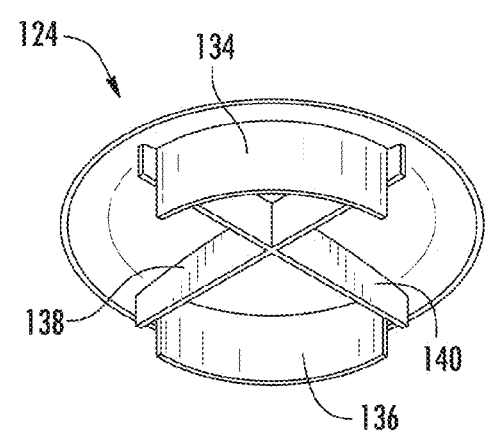
FIGS. 6A and 6B are respective enlarged bottom and top perspective views of a cap element that may be used, for example, in the embodiment of FIGS. 3 and 4.
Figure 6B:
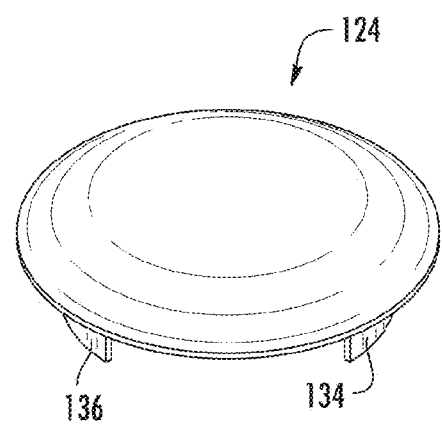

A removable cap 124 is located at the upper end of main housing portion 122. Referring now also to FIGS. 5 and 6A-B, cap 124 in this embodiment has a pair of arcuate flanges 134 and 136 that extend only partially around the circumference of cap 124. In addition, flanges 134 and 136 have a radius approximately the same as the radius of the main housing portion inner surface. As a result, flanges 134 and 136 will snugly retain cap 124 when it is pressed into position at the upper end of main housing portion 122. Screws or rivets may extend through main housing portion 122 into flanges 134 and 136 to further retain cap 124. Suitable stops, here in the form of cross-ribs 138 and 140 (FIG. 6A) are further provided to limit downward movement of cap 124 onto main housing portion 122. The spaces between flanges 134 and 136 thus provide a gap for ventilating the interior cavity of nest box 120.

It will be appreciated that embodiments of the present invention provides several distinct advantages. For example, a wildlife nesting structure may be advantageously integrated into both new and existing utility right of way markers. This design incorporates the features required by secondary cavity nesting birds, bats and small mammals, while also meeting industry requirements for the proper marking of underground utilities and rights of way.

A nest box in accordance with the present invention enables quick placement of high numbers of wildlife nest structures across a wide geographic area. The design adds little if any cost to current line marker enhancers in production today. Since research has continually supported the hypothesis that available nest cavities are a limiting factor for secondary cavity nesting birds, widespread use of utility marker enhancers could result in an easily observable increase in these bird populations on a continental scale.

Large scale implementation among existing or new utility line markers should produce significant increases in observed counts of bird species which depend upon nest cavities. These increases would be observed in a variety of continental bird surveys such as the Audubon Christmas bird count, the Great Backyard Bird Count, Cornell ebird survey, and various other surveys.

Preferred embodiments of the present invention thus allow for a large scale, low cost implementation of cavity nesting habitat across the continental United States, through the integration of the nest cavity with existing structures. The illustrated designs will accommodate a wide array of cavity nesters such as eastern bluebirds, mountain bluebirds, western bluebirds, house wrens, Carolina Wrens, Chickadees, Tufted titmice, tree swallows, prothonotary warblers, bats and small mammals.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A utility marker comprising:
   a support pole which is placed in the ground when installed for use at a desired location being marked;
   an enhancer located at the upper end of said support pole, said enhancer designates a particular type of utility line under the ground via at least one of being colored according to a predetermined color scheme designating said particular type of utility line and having utility marker indicia thereon designating said particular type of utility line; and
   the enhancer defines an internal cavity in which a nesting animal nests, said enhancer further defining an opening extending between said internal cavity and an exterior of said enhancer allows ingress and egress of said nesting animal to and from said internal cavity.

2. A utility marker as set forth in claim 1, wherein said internal cavity of said enhancer has a tubular shape that facilitates a circular nest pattern.

3. A utility marker as set forth in claim 2, wherein said opening is a circular opening.

4. A utility marker as set forth in claim 3, wherein said circular opening has a diameter of approximately 1.5 inches.

5. A utility marker as set forth in claim 1, wherein said enhancer comprises a main housing portion and a cap.

6. A utility marker as set forth in claim 5, wherein said cap is configured to provide ventilation at an upper end of said main housing portion.

7. A utility marker as set forth in claim 1, wherein said enhancer is secured at the upper end of the support pole by one or more fasteners.

8. A utility marker enhancer mountable to a support pole located in the ground, said enhancer comprising:
   a generally tubular main housing portion colored according to a predetermined color scheme which designates a particular type of utility line;
   said main housing portion defining an internal cavity in which a nesting animal nests; and
   said enhancer further defining an opening extending between said internal cavity and an exterior of the main housing portion allows ingress and egress of said nesting animal to and from said internal cavity; and
   a cap removably attached at an upper end of said main housing portion, said cap provides ventilation for the internal cavity of said main housing portion.

9. A utility marker enhancer as set forth in claim 8, wherein said main housing portion has utility marker indicia located thereon.

10. A utility marker enhancer as set forth in claim 8, wherein said opening is a circular opening.

11. A utility marker enhancer as set forth in claim 10, wherein said circular opening has a diameter of approximately 1.5 inches.

12. A utility marker enhancer as set forth in claim 11, wherein said internal cavity has an interior diameter of at least about 4.1 inches.

13. A utility marker enhancer as set forth in claim 8, wherein said main housing portion is formed substantially entirely of plastic material.

14. A utility marker enhancer as set forth in claim 8, wherein said main housing portion defines a lower protrusion for receipt in an open upper end of the support pole.

* * * * *